(12) United States Patent
Ananiev

(10) Patent No.: US 6,234,710 B1
(45) Date of Patent: May 22, 2001

(54) LOCKABLE ADJUSTABLE LENGTH MEMBER

(76) Inventor: Vesko Ananiev, 16 Tanet S Pakuranga, Auckland (NZ)

( * ) Notice: Subject to any disclaimer, the term of this patent is extended or adjusted under 35 U.S.C. 154(b) by 0 days.

(21) Appl. No.: 09/194,131

(22) PCT Filed: May 22, 1997

(86) PCT No.: PCT/NZ97/00062

§ 371 Date: Nov. 23, 1998

§ 102(e) Date: Nov. 23, 1998

(87) PCT Pub. No.: WO97/44588

PCT Pub. Date: Nov. 27, 1997

(30) Foreign Application Priority Data

May 22, 1996 (NZ) .......................................... 286637

(51) Int. Cl.[7] ..................................................... E06C 1/12
(52) U.S. Cl. ..................... 403/374.5; 403/322.4; 248/231.21; 182/201
(58) Field of Search ................................. 403/378, 379.2, 403/379.4, 379.5, 322.4, 109.5, 109.6, 374.5, 374.1; 248/229.21, 228.2, 231.21; 182/200, 201, 202, 107, 204, 205

(56) References Cited

U.S. PATENT DOCUMENTS

| | | | |
|---|---|---|---|
| 2,608,336 | * 8/1952 | Dole | ..................... 182/107 |
| 3,908,796 | * 9/1975 | Hurwitz | ................................ 182/201 |
| 4,029,279 | * 6/1977 | Nakatani | ...................... 403/109.5 X |
| 4,277,197 | 7/1981 | Bingham . | |
| 4,430,019 | * 2/1984 | D'Alessio | .......................... 403/49 X |
| 4,708,309 | 11/1987 | Walter . | |
| 4,761,092 | * 8/1988 | Nakatani | ...................... 403/109.5 X |
| 4,765,439 | * 8/1988 | Kresmery | ............................. 182/107 |
| 5,181,584 | 1/1993 | Simard . | |

FOREIGN PATENT DOCUMENTS

| | | |
|---|---|---|
| 736400 | 9/1956 | (GB) . |
| 2 081 793 | 2/1982 | (GB) . |
| WO 83/03450 | 10/1983 | (WO) . |

* cited by examiner

*Primary Examiner*—Lynne H. Browne
*Assistant Examiner*—John R. Cottingham
(74) *Attorney, Agent, or Firm*—Young & Thompson

(57) ABSTRACT

This invention provides an adjustment length member (100) for fitment to a variety of apparatus including ladders. The preferred form provides two members (1,2) contained in sliding contact one of which (2) has a taper or sloped surface. The members pass through a constriction (3) and a member (21) adjacent, such as a wedge or camming device may be used to adjust the construction to limit the passage of the tapered member through the constriction.

17 Claims, 3 Drawing Sheets

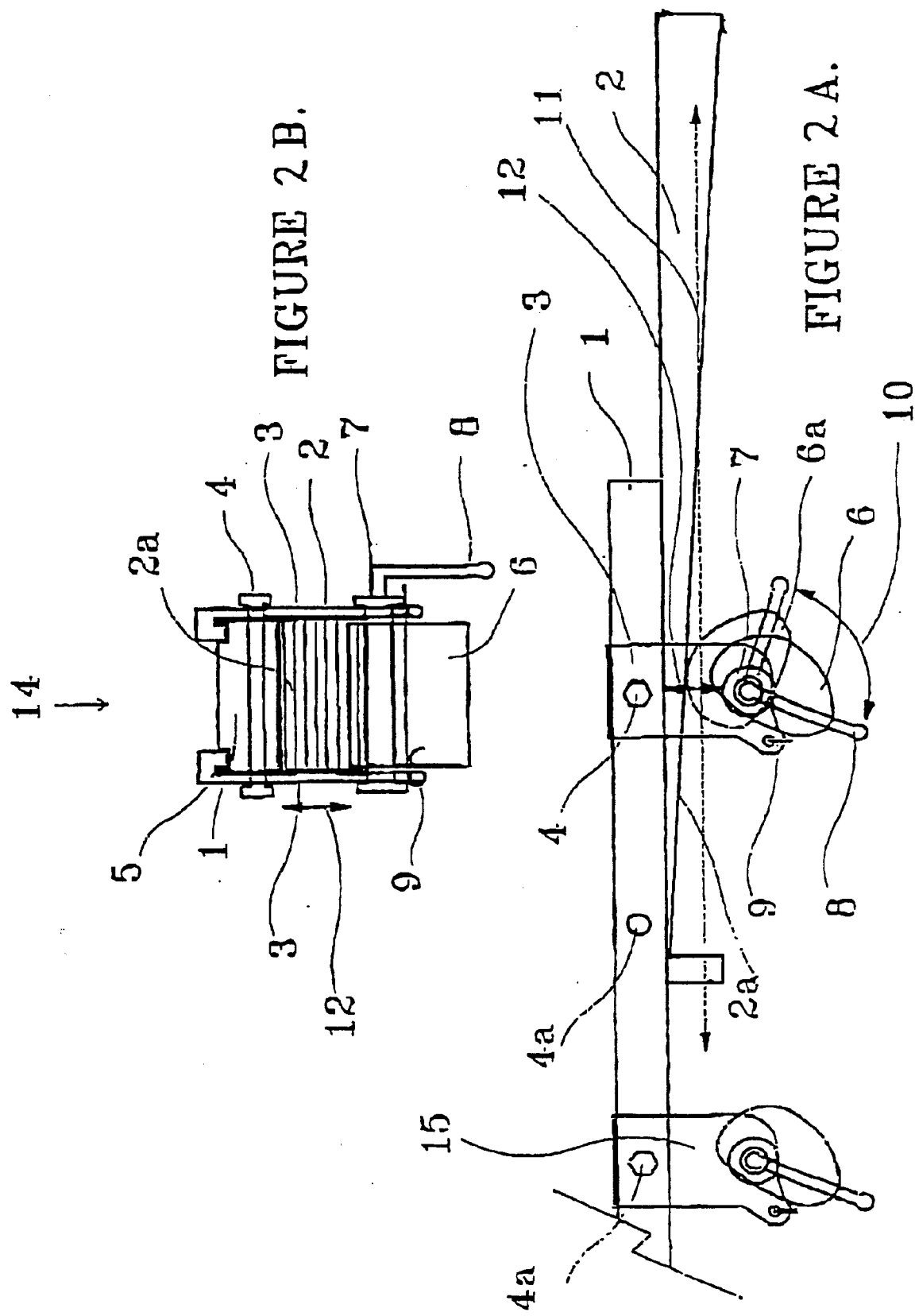

LOCKABLE ADJUSTABLE LENGTH MEMBER

This application was filed as PCT International application No. PCT/NZ97/00062 on May 22, 1997 and claims priority under 35 USC §119 based on New Zealand application No. 286637 filed on May 22, 1996.

This invention relates to devices which provide or allow for the adjustment and thereafter locking in the length of a member.

Lockable extending members are an integral part of many industries and used for the likes of propping, levelling, positioning or limiting of objects relative to a task. Known devices include sliding devices which are extendable and stepped by increments provided by teeth and dog or pin and hold type systems. A range of tensioning devices that lock two members together and rely on frictional resistance between them are also known. Flexible member materials are also known having papers on two separate members which conflict where a degree of pressure is applied to deform at least one of the members. Some wedging devices are also known where a wedge is inserted between two sliding members.

These prior art devices have drawbacks in that the pins are loose objects and prone to loss or damage. This can lead to sufficient were to make the device unsafe under load. Toothed racks also have similar problems and both forms are prone to shaking loose.

Tension based locking systems can be unreliable as they are prone to slippage and wear and also operator judgement as to the adequate tension for the environmental conditions. Special tools for tensioning the items may also be necessary and may be lost or damaged.

Those devices using flexible material tapers do provide some degree of random variation of the link yet are often set in increments who like narrowings in the diameter or a tubular member with a sprung external tube member chuck providing the constriction. These may be prone to material fatigue and weakening of the internal member. Further, operator judgement is required as to the adequacy of the locked position on the taper.

The use of a wedge on its own is also prone to loss and damage or shaking loose.

OBJECT OF THE INVENTION

It is an object of the present invention to provide apparatus allowing for the length of a member or assembly to be altered and selectively locked which at least in part overcomes one or more of the above mentioned disadvantages or which at least provides the public with a useful choice.

SUMMARY OF THE INVENTION

Accordingly in a first aspect the present invention may broadly be said to consist in an adjustment length member comprising:
 a first member or assembly;
 a second member or assembly having a sloped surface;
 retaining means to retain said first and second members in sliding contact;
 a constraint provided in or about said first and second members to limit the passage of the sloped surface on said second member through said constraint; and
 an adjustment means to adjust at the constraint to vary the passage of the second member through said constraint in at least one direction.

BRIEF DESCRIPTION OF THE DRAWINGS

The invention consists in the foregoing and also envisages constructions of which the following gives examples.

One preferred form of the present invention will now be described with reference to the accompanying drawings in which:

FIG. 1C depicts a tongue and groove slide arrangement 5 with an I beam structure and member 1 with a taper member 2 fitting into the channel taper as depicted by 2a;

FIGS. 2A & 2B depicts a constriction device 3 and alternate position 15, cam position 6, 7 vary constrict 12 of member 2 constrict is fixed at holes 4 and 4a alternative, pin 9 is a limiting mechanism;

DETAILED DESCRIPTION OF PREFERRED EMBODIMENTS

Figure 1C:
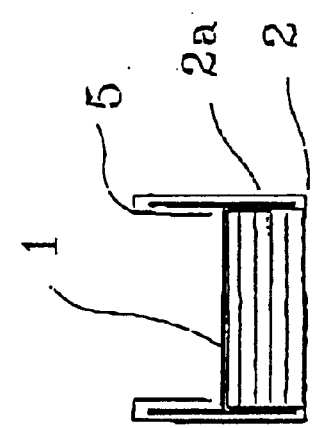
Figure 1B:
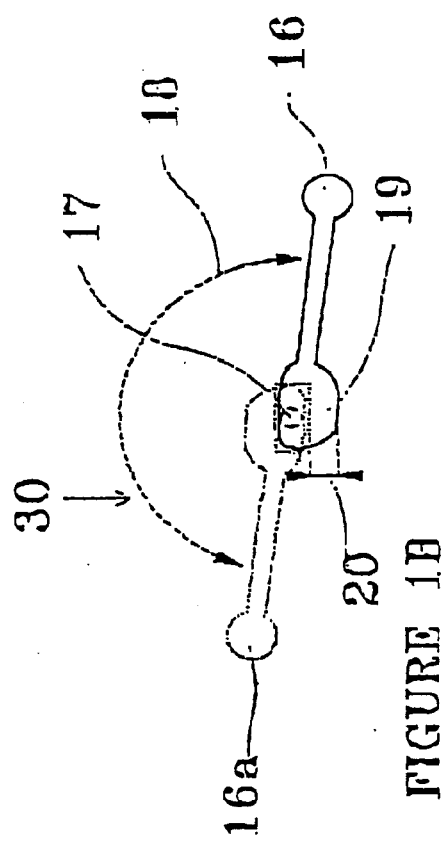
FIG. 1B depicts an alternative to the form of the invention which utilises nut 23 with or without adjusting taper 21, nut 17 may be tensioned by winding lever 18a then swinging it over to position 16 to cam a constriction dimension 20.
Figure 1A:
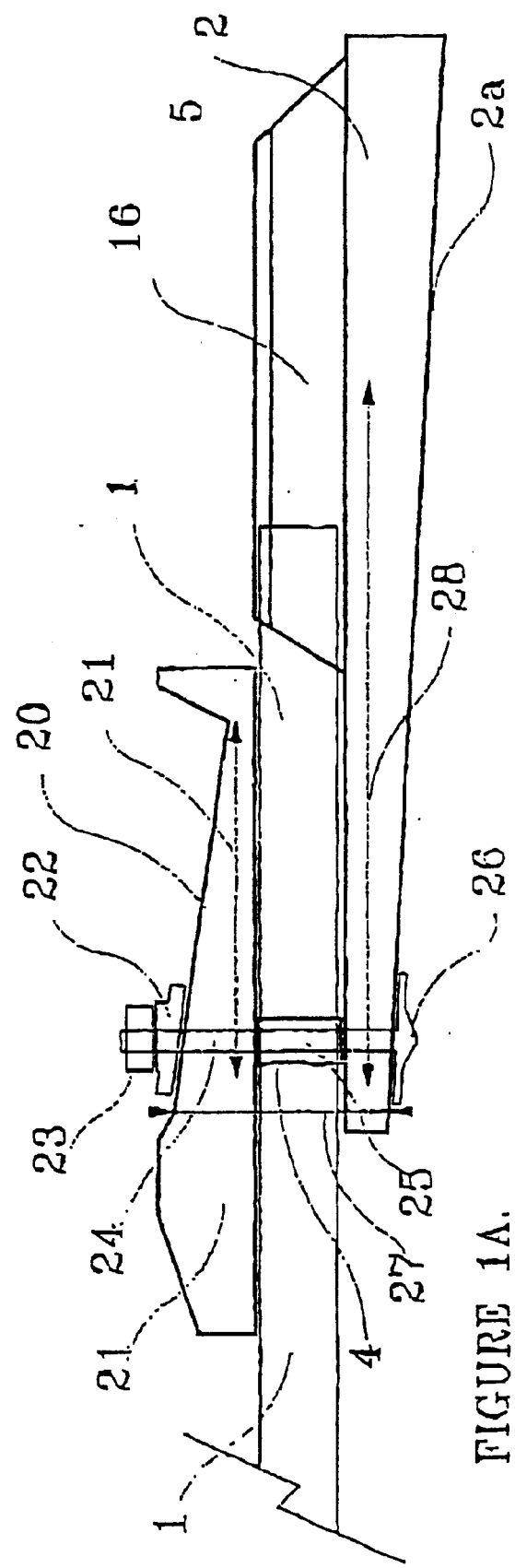
FIG. 1A depicts a constraining member 1 held in a sliding relationship with the tapered member 2 by tongue and grooves 5 along direction of slot 28 (now shown), the constrict is held by bolt 24, washer 22 and nut 23, that passes through member 1 via the fixed hole 25, adjusting wedge 21 adjusts the constrict dimensions 27 between nut 23 and washer 22 and flared bolt nut 26, either by turning the nut 23 or by sliding the wedge 21, the dimensions of the constrict 27 are changed allowing more or less of the taper to fit in the constrained space and the change in length be arrested, the fixing of the bolt 26 through member 1 at hole 25 prevents the constrict assembly 26, 21, 22, 23 from sliding along member 1, the high safety or fail safe nature of at least preferred forms of the present invention is enhanced by the constraining force applied by bolt 26 containing the expansion of the thrusting taper.

Present in preferred forms of the invention is a retaining means 3. Said retaining means retaining said first and second members in contact preferably in sliding contact.

Also present in a preferred form of the present invention is a locking member or means 21, said locking member or means 21, capable of abutting said second member against said first member or vice versa thereby locking said first member and said second member in a position with respect to their length.

Preferred forms of the present invention may be used to provide for adjustable length or other dimension in a wide variety of other devices. For example, preferred forms of the present invention 100 may provide for adjustment in the length of a leg of a ladder thus enabling the ladder to be used safely on sloping or uneven ground. The operation of a preferred form of the present invention will now be described. The first member 1 and second member 2 can slide relative to each other thus enabling the overall length of said adjustable lockable device 100 to be adjusted. Once the correct length has achieved the locking member or means 21 is locked thus causing the adjustable length member 100 to be locked in place. Preferred forms of the present invention are produced from a metallic material such as aluminium, steel, preferably mild steel, or other suitable materials. Those skilled in the art to which the invention relates will realise that a variety of manufacturing techniques are possible, for example, machining or otherwise producing the devices 100.

The constriction device means or locking member or means 3 may be one or more pin or bolt type devices, they may be arranged to lie through the first and second members by way of slots in the wedge to enable travel in the shear direction but will be fixed by holes in the second member. Alternatively they may be positioned to the sides of the first and second members and by way of end plates surround the two members, in this case either the pin, bolts or straps will be clear and free of the sides of first member but fixed to the second member. One side of the constricting device 3 and member must contain a means of applying pressure evenly to cause the constriction through the bolts. The wedge side may have a force distributing plate shaped in conjunction with the other components to evenly contact the slope surface of the wedge and the constricting apparatus. Another alternative is to utilise a sleeve or U with closing plate type constricting means shaped to perform the above mentioned roles along with the rest of the containment arrangement. The constriction means 3 will be fixed to the second member and contact the sloping surface of the wedge.

Figure 3:
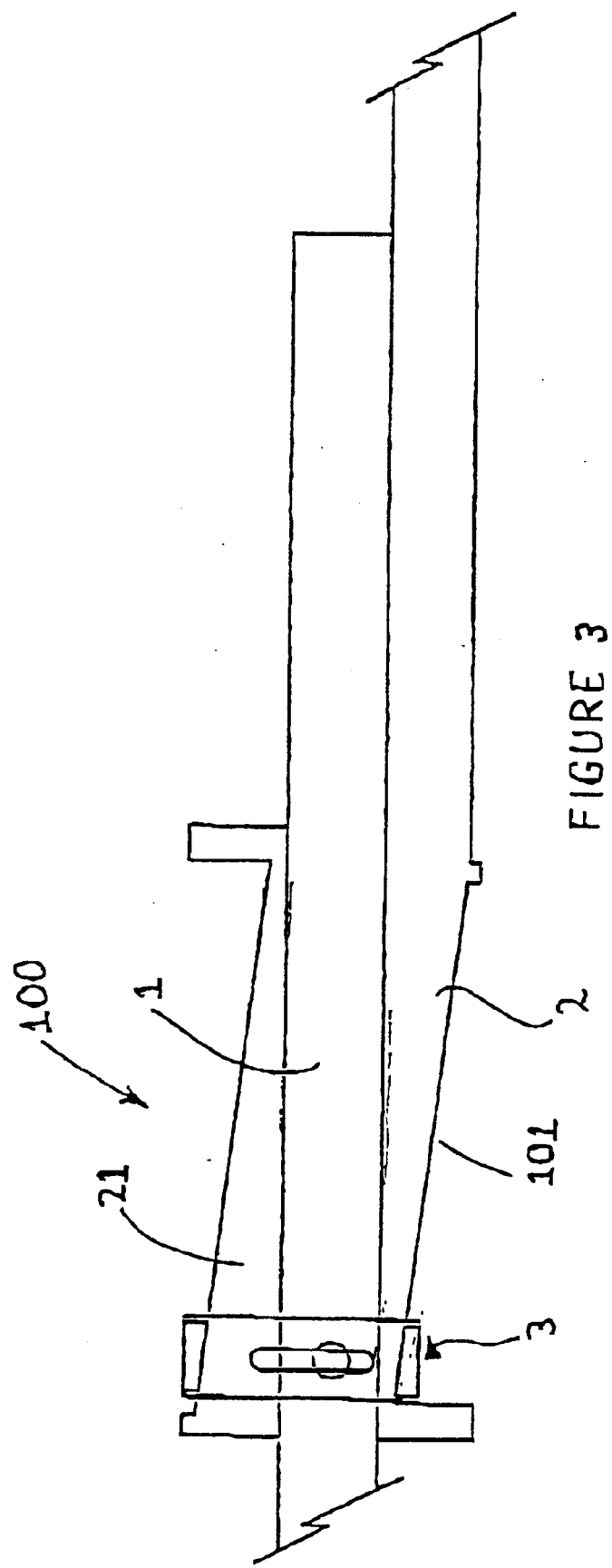
FIG. 3 shows a preferred form of the present invention which provides an adjustable length member 100, the adjustable length member 100 comprises a first member or assembly thereinafter "first member") 1 and a second member or assembly (hereinafter "second member") 2, said second member 2 having a slope or sloping surface 101.

The constriction means 3 will have an adjustment means to adjust the members sliding extents by means of the size of the constriction. The preferred option is the use of an adjusting wedge arranged with the taper or slope opposed to that of the first member wedge and made operative through a U sleeve with the joining plate adapted to guide and support the adjusting wedge position. The contact surfaces of wedge slopes are, in preferred forms of the present invention, smooth. In preferred forms of the present invention the adjusting wedge has appendages or abutments that will prevent constriction release beyond that of the slope of the prime wedge and to prevent the dislodgement of the wedge through the narrower end. Alternatively a similar adjusting wedge may pass through slots or an end plate of the fore mentioned rod/bolts/strap, sleeve arrangements. Yet another alternative is to utilise nuts as the said constriction adjusters, those nuts may have swinging handles, those swinging handles may have a "flip past centre" cam actuator as a further pinch or tension release means to the plate below the nut. Yet another alternative is the use of the U sleeve with the deep end surrounding and fixed to the second member with a coaxial cam device pivoted through the sides of the U. The restrictive rotary direction of the cam must constrict with the thrust direction of the wedge. There may be a cam rotation limiting pin to limit the opening to the slope of the wedge to prevent total disengagement of the two members via a knob as shown in FIG. 3. The removal of that pin 4 will enable relocation of the constricting mechanism 3 to another location on the second member as the added clearance will enable clearance of location dowels otherwise fixing the constriction device to the second member, the cam may have a lever and a spool to enable remote and/or manual control of the constriction.

Remote control linkages or cables may be fitted to the constriction adjusting means for ease of operation, spring loading to resist movements during shaking, vibrating or gravity may hold the wedges in contact with the constricting means 3. Covers to prevent foreign objects, for example human appendages, entering the contraction space may also be fitted in preferred forms of the present invention.

Any combinations of alternative constricting or adjusting may be utilised.

It can be seen that the present invention provides an adjustable length member 100. Such an adjustable length member may find a variety of uses in providing for the adjustment in length and then locking of a member, for example, legs of a ladder etc. The adjustment provided is preferably continuous between the maximum and minimum range in length of the member 100. Preferred forms of the invention are robust in use in that they are relatively unaffected by contaminated by grease or other foreign bodies and/or parts of the device are bound together thus limiting the chance of smaller parts being lost due to operator error.

In use, it can be seen that at least the preferred form of the invention provides an apparatus in which the wedge or similar device can be used to change the dimension of the constriction to stop variation in the movement in at least a first direction between the two sliding members, one of which is tapered. In providing the apparatus in the manner shown, the wedge tends to lock into the constrict when the sliding members are under a compressive load. The compressive load tries to force the tapered member further into the constriction and can jam the wedge or similar adjuster in place. This reduces any risk of the items becoming free during use. To adjust the mechanism, the wedge must be withdrawn and this can realistically only be achieved in an unloaded condition. A cable and lever arrangement or any other arrangement connected to the wedge can facilitate removal of the wedge when desired. As previously mentioned, it may be desirable for a biasing means such as a spring or even rely on some gravity by arranging the wedge above the constriction to bias the wedge or other adjuster into the locked position.

Thus the present invention provides an adjustment length member which will at least provide the public with a useful choice.

Where in the foregoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope or spirit of the invention.

What is claimed is:

1. An adjustable length assembly including:
   (a) a first member;
   (b) a second member;
   (c) the first and second members being structurally supported in a sliding relationship establishing a sliding direction and a sliding plane;
   (d) the first member having a section of its length wherein the cross section in the sliding direction ramps at a taper angle from the sliding direction;
   (e) a constraint mechanism coupled to the second member and fixed against movement from the second member in the sliding direction but adjustably moveable from the second member substantially transverse to the sliding plane, the constraint mechanism interengaging with the first member such that the constraint mechanism is movable in response to an adjusted relative position of the first and second members in the sliding direction;
   (f) the constraint mechanism including a restraining surface which is contactable with a ramp surface of the ramp section of the first member;
   (g) an adjustable locking element located between the second member and the constraint mechanism said locking element being isolated from direct contact with or influence arising from relative sliding movement between the first and second members whereby the constraint and restraining surface can be locked in position relative to the second member at a required ramp position relative to the sliding plane to lock the first and second members in an adjusted position in the sliding direction.

2. An adjustable length assembly as claimed in claim 1 wherein the locking element is a tapered wedge.

3. An adjustable length assembly as claimed in claim 1 wherein the locking element is a camming device.

4. An adjustable length assembly as claimed in claim 1 wherein the locking element is a threaded device.

5. An adjustable length assembly as claimed in claim 1 further including a release mechanism to release the locking element from its locking position.

6. An adjustable length assembly as claimed in claim 5 further including a biasing arrangement to bias the locking element into its locking position.

7. An adjustable length assembly as claimed in claim 1 further including a first stop which prevents release of the locking element from the assembly when the locking element is moved relative to the constraint.

8. An adjustable length assembly as claimed in claim 1 further including a second stop to prevent said first member from moving relative to the constraint and become released from the constraint.

9. An adjustable length assembly as claimed in claim 5 further including a remote control mechanism for operating the release mechanism.

10. An adjustable length assembly as claimed in claim 1 wherein the constraint includes a second contact surface slidingly engaged with a surface of an elongate portion of said locking element, said elongate portion being shaped in the form of a tapered wedge.

11. an adjustable length assembly as claimed in claim 10 wherein the locking element is a tapered wedge which increases in cross-sectional thickness in an opposite direction to the increase in cross-sectional thickness of the first member.

12. An adjustable length assembly including first and second members adjustable slideable relative to one another in a longitudinal direction, the second member including a first ramped section, a constraint coupled to the first member and only movable substantially laterally relative to said longitudinal direction in response to a changed dimension between a surface of the first ramped section and the first member when the relative positions of the first and second members are adjusted in said longitudinal direction, and a locking member in the form of a wedge that has a second ramped section the taper of which extends in an opposite direction to that of said first ramped section, said second ramped section being in sliding contact with said first member such that when the locking member is moved relative to the first member into a locking position interaction between the constraint and said second ramped section causes a compressive locking force to be applied between the first member and respective of said second member and locking member to prevent movement in at least a first direction between the first and second members.

13. An adjustable length assembly as claimed in claim 12 further including a release mechanism to release the locking member from its locking position.

14. An adjustable length assembly as claimed in claim 13 further including a biasing mechanism to bias the locking member into its locking position.

15. An adjustable length assembly as claimed in claim 13 further including a remote control device for operating the release mechanism.

16. An adjustable length assembly as claimed in claim 12 wherein the first member is the leg of a ladder and the second member is an extension leg.

17. An adjustable length assembly as claimed in claim 12 wherein the second member is a leveling leg.

* * * * *